United States Patent
Tomida et al.

(10) Patent No.: US 10,141,760 B2
(45) Date of Patent: Nov. 27, 2018

(54) POWER SUPPLY CIRCUIT, CHARGE CIRCUIT, CHARGING SYSTEM, POWER SUPPLYING METHOD, AND CHARGING METHOD

(71) Applicant: SOCIONEXT INC., Yokohama-shi, Kanagawa (JP)

(72) Inventors: Junji Tomida, Kasugai (JP); Yasushi Aoyama, Tajimi (JP)

(73) Assignee: SOCIONEXT INC., Yokohama (JP)

( * ) Notice: Subject to any disclaimer, the term of this patent is extended or adjusted under 35 U.S.C. 154(b) by 279 days.

(21) Appl. No.: 15/002,308

(22) Filed: Jan. 20, 2016

(65) Prior Publication Data
US 2016/0226244 A1 Aug. 4, 2016

(30) Foreign Application Priority Data
Feb. 2, 2015 (JP) .................. 2015-018754

(51) Int. Cl.
*H02J 7/00* (2006.01)
(52) U.S. Cl.
CPC .......... *H02J 7/0052* (2013.01); *H02J 7/0031* (2013.01); *H02J 2007/0062* (2013.01)
(58) Field of Classification Search
CPC .............. H02J 7/0052; H02J 7/0031; H02J 2007/0062; H02J 7/0021; H02J 7/0029; H02J 7/0045; H02J 7/007; H02J 2007/0095; H02J 2007/0096; H02J 7/0044; H02J 50/10
USPC ......................................... 320/107
See application file for complete search history.

(56) References Cited

U.S. PATENT DOCUMENTS

| | | | |
|---|---|---|---|
| 2011/0260742 A1 | 10/2011 | Sims et al. | |
| 2011/0269513 A1 | 11/2011 | Lin et al. | |
| 2012/0119696 A1* | 5/2012 | Picard | H01M 10/48 320/107 |
| 2014/0239985 A1 | 8/2014 | Sims et al. | |
| 2015/0349561 A1* | 12/2015 | Berggren | H02J 7/007 320/162 |

FOREIGN PATENT DOCUMENTS

| | | |
|---|---|---|
| JP | 2010-171589 A | 8/2010 |
| JP | 2011-233129 A | 11/2011 |
| JP | 2011-234355 A | 11/2011 |
| JP | 2013-132183 A | 7/2013 |

* cited by examiner

*Primary Examiner* — Drew A Dunn
*Assistant Examiner* — Sailesh Thapa
(74) *Attorney, Agent, or Firm* — Arent Fox LLP

(57) ABSTRACT

A power supply circuit includes a first power supply, which is electrically coupled to a first power supply terminal and a first ground terminal, and a short-circuit line. The first power supply is adapted to supply the first power supply terminal with a DC voltage having a higher electric potential than the first ground terminal. The short-circuit line is adapted to short-circuit a first data terminal and a second data terminal. The power supply circuit further includes a second power supply electrically coupled to the first ground terminal and the short-circuit line. The second power supply is adapted to supply the first data terminal and the second data terminal with a negative voltage having a lower electric potential than the first ground terminal.

10 Claims, 6 Drawing Sheets

POWER SUPPLY CIRCUIT, CHARGE CIRCUIT, CHARGING SYSTEM, POWER SUPPLYING METHOD, AND CHARGING METHOD

CROSS-REFERENCE TO RELATED APPLICATIONS

This application is based upon and claims the benefit of priority from prior Japanese Patent Application No. 2015-018754, filed on Feb. 2, 2015, the entire contents of which are incorporated herein by reference.

FIELD

This disclosure relates to a power supply circuit, a charge circuit, a charging system, a power supplying method, and a charging method.

BACKGROUND

Electronic devices such as personal computers and mobile terminals include universal serial bus (USB) ports. Such type of an electronic device incorporates, for example, a rechargeable battery and a charge circuit for charging the rechargeable battery. The charge circuit charges the rechargeable battery with power supplied through the USB port from a USB host.

Various types of power supply ports, which supply charging power, are specified as the USB ports of the USB host. For example, three types of power supply ports, namely, a standard downstream port (SDP), a charging downstream port (CDP), and a dedicated charging port (DCP), are defined by the USB battery charging standard, which has been formed as an extended version of the USB specification.

The SDP, which is the same port as that defined in the USB 2.0 specification, is typically included in a USB host and a USB hub. The SDP is capable of supplying current of 0.5[A] at most to an electronic device (USB device). The CDP is defined as a port capable of performing charging with a larger current than the SDP while maintaining a USB communication function in the USB host or the USB hub. The CDP is capable of supplying current of 1.5[A] at most to the USB device. The SDP and the CDP each use two data terminals D+, D– of the USB port to perform enumeration (connection recognition) through data communication between the USB device and the USB host.

The DCP is defined as a port dedicated to charging and does not have the USB communication function. Thus, the DCP is arranged in a power supply device (USB host) such as an AC adapter or a car adapter, which does not perform the enumeration. The DCP is capable of supplying current of 1.5[A] at most to the USB device.

The electronic device (USB device) detects the electrical state of the two data terminals D+, D– of a USB port to identify the type of the USB host connected to the USB port. For example, when the two data terminals D+, D– are short-circuited, the USB host is identified as the DCP (i.e., USB host including DCP).

Japanese Laid-Open Patent Publication Nos. 2011-234355 and 2010-171589 describe the above related art.

SUMMARY

As described above, the current (current capacity) that can be supplied by the USB host is set for each power supply port. Additionally, the upper limit of power that can be supplied to the USB device is set for each power supply port. Thus, when a rechargeable battery mounted on the USB device has a large capacity, it may take much time to charge the rechargeable battery.

One aspect of this disclosure is a power supply circuit that includes a first power supply, a short-circuit line, and a second power supply. The first power supply is adapted to be electrically coupled to a first power supply terminal and a first ground terminal. The first power supply supplies the first power supply terminal with a DC voltage having a higher electric potential than the first ground terminal. The short-circuit line is adapted to short-circuit a first data terminal and a second data terminal. The second power supply is adapted to be electrically coupled to the first ground terminal and the short-circuit line. The second power supply supplies the first data terminal and the second data terminal with a negative voltage having a lower electric potential than the first ground terminal.

Other aspects and advantages of this disclosure will become apparent from the following description, taken in conjunction with the accompanying drawings, illustrating by way of example the principles of this disclosure.

BRIEF DESCRIPTION OF THE DRAWINGS

The embodiments are illustrated by way of example and are not limited by the accompanying figures, in which like references indicate similar elements. Elements in the figures are illustrated for simplicity and clarity and have not necessarily been drawn to scale. In the drawings, like numerals are used for like elements throughout.

DESCRIPTION OF THE EMBODIMENTS

One embodiment will now be described with reference to FIGS. 1 to 6.

Figure 1:
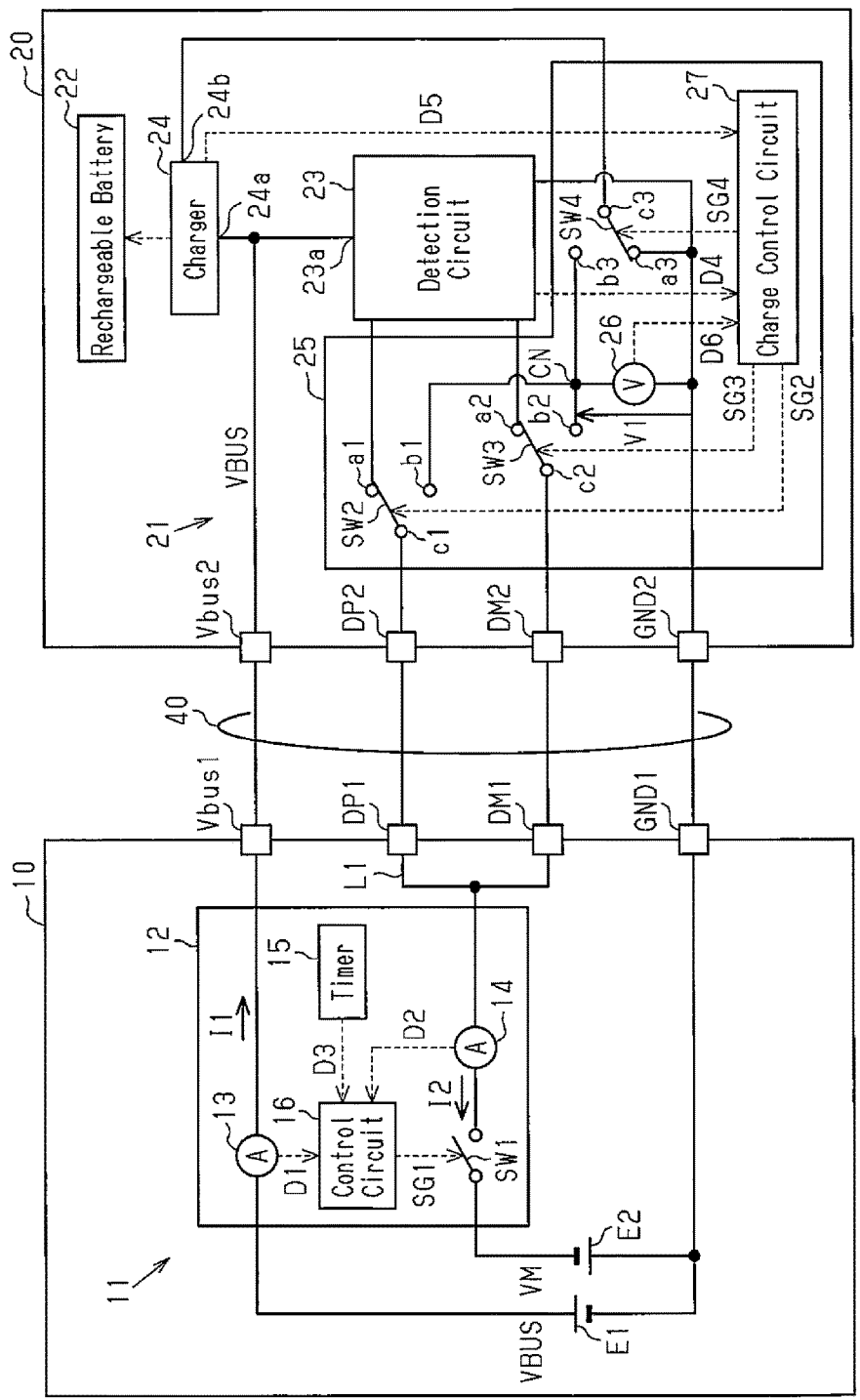
FIG. 1 is a schematic block diagram illustrating one embodiment of a charging system.

As illustrated in FIG. 1, a charging system includes a power supply device 10 and an electronic device 20. The power supply device 10 is, for example, a USB host including a USB port that satisfies the USB battery charging standard. The USB port of the power supply device 10 is set to, for example, the DCP of the USB battery charging standard. The power supply device 10 is, for example, an AC adapter, a car adapter, or a USB charger.

The electronic device 20 is, for example, a USB device including a USB port that satisfies the USB battery charging standard. The electronic device 20 is, for example, a portable device such as a smartphone, a PDA, or a digital camera. The electronic device 20 includes, for example, a rechargeable battery 22 and may be driven by the rechargeable battery 22. When connected to the power supply device 10 by a cable 40, the electronic device 20 charges the rechargeable battery 22 with power supplied from the power supply device 10. The cable 40 is, for example, a USB cable.

The USB port of the power supply device 10 includes four terminals interfacing with the cable 40, namely, a power supply terminal Vbus1, two data terminals DP1, DM1, and a ground terminal GND1. The power supply device 10 includes a power supply circuit 11, which is connected to the power supply terminal Vbus1, the data terminals DP1, DM1, and the ground terminal GND1.

The power supply circuit 11 includes a short-circuit line L1, power supplies E1, E2, and a negative voltage control circuit 12. The short-circuit line L1 short-circuits the data terminal DP1 and the data terminal DM1. The short-circuit line L1 has, for example, a given resistance component. The short-circuit line L1 sets the USB port of the power supply device 10 to the DCP.

The power supply E1 generates a bus voltage VBUS having an electric potential that is higher than that of the ground terminal GND1 (e.g., 0 [V]). For example, when the power supply device 10 is connected to an external power supply such as a commercial power supply or the battery of an automobile, the power supply E1 generates the bus voltage VBUS, which is DC voltage, from AC voltage or DC voltage supplied from the external power supply. The power supply E1 may be, for example, an AC-DC converter, which converts AC voltage supplied from the commercial power supply to the power supply device 10 into DC voltage.

The power supply E1 includes a positive terminal and a negative terminal. The positive terminal of the power supply E1 is electrically coupled to the power supply terminal Vbus1 via the negative voltage control circuit 12. Thus, the bus voltage VBUS, which is generated in the power supply E1, is supplied to the power supply terminal Vbus1 through the negative voltage control circuit 12. The negative terminal of the power supply E1 is coupled to the ground terminal GND1. The difference in electric potential between the power supply terminal Vbus1 and the ground terminal GND1, that is, the voltage value of the bus voltage VBUS, may be set to, for example, 5 [V].

The power supply E2 generates a negative voltage VM having an electric potential that is lower than that of the ground terminal GND1 (e.g., 0 [V]). For example, when the power supply device 10 is connected to an external power supply, the power supply E2 generates the negative voltage VM, which is DC voltage, from AC voltage or DC voltage supplied from the external power supply. In the same manner as the power supply E1, the power supply E2 is, for example, an AC-DC converter, which converts AC voltage supplied from the commercial power supply to the power supply device 10 into DC voltage.

The power supply E2 includes a positive terminal and a negative terminal. The negative terminal of the power supply E2 is electrically coupled to the short-circuit line L1 (i.e., data terminals DP1, DM1) via the negative voltage control circuit 12. Thus, the negative voltage VM, which is generated in the power supply E2, is supplied to the data terminals DP1, DM1 through the negative voltage control circuit 12. The positive terminal of the power supply E2 is coupled to the ground terminal GND1. The difference in electric potential between the short-circuit line L1 (data terminals DP1, DM1) and the ground terminal GND1, that is, the voltage value of the negative voltage VM, may be set to, for example, −5 [V].

The negative voltage control circuit 12 includes a switch SW1, current detection circuits 13, 14, a timer 15, and a control circuit 16.

The switch SW1 is electrically coupled between the negative terminal of the power supply E2 and the short-circuit line L1 (data terminals DP1, DM1). The switch SW1 includes, for example, a first terminal, which is coupled to the negative terminal of the power supply E2, and a second terminal, which is coupled to the short-circuit line L1. The switch SW1 is controlled to be activated and deactivated in accordance with a control signal SG1 provided from the control circuit 16. When the switch SW1 is activated, the negative terminal of the power supply E2 is coupled to the data terminals DP1, DM1. Thus, the negative voltage VM is supplied from the power supply E2 to the data terminals DP1, DM1. When the switch SW1 is deactivated, the power supply E2 is separated from the data terminals DP1, DM1. Consequently, the short-circuit line L1 simply short-circuits the data terminal DP1 and the data terminal DM1. In other words, when the switch SW1 is deactivated, the short-circuited data terminals DP1, DM1 are electrically separated from other terminals (i.e., power supply terminal Vbus1 and ground terminal GND1).

The current detection circuit 13 detects a current I1 flowing between the power supply terminal Vbus1 and the ground terminal GND1. The current detection circuit 13 generates a detection signal D1, which indicates the current value of the current I1. The detection signal D1 is provided to the control circuit 16.

When the switch SW1 is activated, the current detection circuit 14 detects a current I2 flowing between the data terminals DP1, DM1 and the ground terminal GND1. The current detection circuit 14 generates a detection signal D2, which indicates the current value of the current I2. The detection signal D2 is provided to the control circuit 16. The current detection circuits 13, 14 each may be, for example, a resistance element.

The timer 15 resets a measurement time and starts a timer operation (time measurement) based on an instruction from the control circuit 16. When a given time elapses from when the timer operation is started, the timer 15 provides the control circuit 16 with a termination signal D3, which indicates the termination of the timer operation.

The control circuit 16 generates the control signal SG1, which controls the activation and deactivation of the switch SW1, based on the detection signals D1, D2 and the termination signal D3. For example, when detecting that the current I1 flows between the power supply terminal Vbus1 and the ground terminal GND1, the control circuit 16 generates a control signal SG1 that activates the switch SW1 (e.g., H-level control signal SG1). When detecting that current does not flow between the power supply terminal Vbus1 and the data terminals DP1, DM1 during a period from when the switch SW1 is activated until when the given time elapses, the control circuit 16 generates a control signal SG1 that deactivates the switch SW1 (e.g., L-level control signal SG1).

The internal structure of the electronic device 20 will now be described.

The USB port of the electronic device 20 includes four terminals interfacing with the cable 40, namely, a power supply terminal Vbus2, two data terminals DP2, DM2, and a ground terminal GND2. When the electronic device 20 is connected to the power supply device 10 by the cable 40, the power supply terminal Vbus2 is electrically coupled to the power supply terminal Vbus1 of the power supply device 10 by a power supply line of the cable 40. Thus, the bus voltage VBUS is supplied from the power supply terminal Vbus1 to the power supply terminal Vbus2 through the cable 40. Additionally, when the electronic device 20 is connected to the power supply device 10 by the cable 40, the data terminals DP2, DM2 are electrically coupled to the corresponding data terminals DP1, DM1 by signal lines of the cable 40. Further, the ground terminal GND2 is electrically coupled to the ground terminal GND1 by a ground line of the cable 40. Thus, the power supply terminal Vbus1, the data terminals DP1, DM1, and the ground terminal GND1 of the USB port of the power supply device 10 are respectively coupled to the power supply terminal Vbus2, the data terminals DP2, DM2, and the ground terminal GND2 of the USB port of the electronic device 20 by the power supply line, the signal lines, and the ground lines of the cable 40. FIG. 1 illustrates an example in which the power supply device 10 is connected to the electronic device 20 by the cable 40. However, each terminal of the USB port of the power supply device 10 may be directly connected to the corresponding terminal of the USB port of the electronic device 20.

The electronic device 20 includes a charge circuit 21, which is coupled to the power supply terminal Vbus2, the data terminals DP2, DM2, and the ground terminal GND2, and the rechargeable battery 22. When the electronic device 20 is connected to the power supply device 10 by the cable 40, the charge circuit 21 charges the rechargeable battery 22 with power supplied from the power supply device 10. The rechargeable battery 22 may be, for example, a repeatedly rechargeable battery such as a lithium-ion rechargeable battery or a sodium-ion rechargeable battery.

The charge circuit 21 includes a detection circuit 23, a charger 24, and a mode setting circuit 25. The charge circuit 21 is driven, for example, by the bus voltage VBUS, which is supplied through the power supply terminal Vbus2 and serves as the power supply voltage. The power supply terminal Vbus2 is coupled to, for example, a high electric potential power supply terminal 23a of the detection circuit 23 and a high electric potential power supply terminal 24a of the charger 24.

The detection circuit 23 is coupled to the data terminals DP2, DM2 via the mode setting circuit 25. When the electronic device 20 is connected to the power supply device 10, the detection circuit 23 determines the type of the USB port of the power supply device 10 based on the electrical state (connection state) of the data terminals DP2, DM2. For example, when the data terminals DP2, DM2 are short-circuited and electrically separated from other terminals, the detection circuit 23 determines that the USB port of the power supply device 10 is set to the DCP. Then, the detection circuit 23 provides a determination signal D4, which indicates the determination result, to the mode setting circuit 25.

The mode setting circuit 25 sets the charge mode of the charge circuit 21 based on the determination signal D4 from the detection circuit 23. The mode setting circuit 25 sets the charge mode of the charge circuit 21 to, for example, a first charge mode or a second charge mode. In the first charge mode, the charge circuit 21 receives power from the power supply device 10 between the power supply terminal Vbus2 and the data terminals DP2, DM2. In the second charge mode, the charge circuit 21 receives power from the power supply device 10 between the power supply terminal Vbus2 and the ground terminal GND2. The mode setting circuit 25 includes a switch SW2, a switch SW3, a switch SW4, a voltage detection circuit 26, and a charge control circuit 27. The determination signal D4, which is generated in the detection circuit 23, is provided to the charge control circuit 27.

The switch SW2 includes terminals a1, b1 and a common terminal c1. The common terminal c1 is coupled to the data terminal DP2. The terminal a1 is coupled to the detection circuit 23. In the same manner, the switch SW3 includes terminals a2, b2 and a common terminal c2. The common terminal c2 is coupled to the data terminal DM2. The terminal a2 is coupled to the detection circuit 23. The terminal b2 is coupled to the terminal b1 of the switch SW2. In the same manner, the switch SW4 includes terminals a3, b3 and a common terminal c3. The common terminal c3 functions as an output terminal of the mode setting circuit 25 and is coupled to a low electric potential power supply terminal 24b of the charger 24. The terminal a3 is coupled to the detection circuit 23 and the ground terminal GND2 of the USB port. The terminal b3 is coupled to the terminal b2 of the switch SW2. That is, the terminals b1, b2, b3 of the switches SW2, SW3, SW4 are coupled together by a connection node CN.

The switch SW2 connects the common terminal c1 selectively to the terminal a1 and the terminal b1 based on a control signal SG2, which is provided from the charge control circuit 27. The switch SW3 connects the common terminal c2 selectively to the terminal a2 and the terminal b2 based on a control signal SG3, which is provided from the charge control circuit 27.

The switch SW4 connects the common terminal c3 selectively to the terminal a3 and the terminal b3 based on a control signal SG4, which is provided from the charge control circuit 27.

The voltage detection circuit 26 detects a voltage V1 between the connection node CN (i.e., terminal b3 of switch SW4) and the connection terminal GND2 (i.e., terminal a3 of switch SW4). The voltage detection circuit 26 provides a detection signal D6, which indicates the voltage value of the voltage V1, to the charge control circuit 27.

The charge control circuit 27 receives the determination signal D4 from the detection circuit 23, a charge completion signal D5 from the charger 24, and the detection signal D6 from the voltage detection circuit 26. Then, the charge control circuit 27 generates a control signal SG2, which controls the switching of the switch SW2, a control signal SG3, which controls the switching of the switch SW3, and a control signal SG4, which controls the switching of the switch SW4, based on the detection signals D4, D5, D6.

Before the electronic device 20 is connected to the power supply device 10, the charge control circuit 27 generates, for example, the L-level control signals SG2, SG3, SG4 (e.g., ground voltage level). The switch SW2 connects the common terminal is to the terminal is in response to the L-level control signal SG2. The switch SW3 connects the common terminal c2 to the terminal a2 in response to the L-level control signal SG3. This connects the data terminals DP2, DM2 to the detection circuit 23. Additionally, the switch SW4 connects the common terminal c3 to the terminal a3 in response to the L-level control signal SG4. This connects the ground terminal GND2 to the low electric potential power supply terminal 24b of the charger 24. These connections of the switches SW2, SW3, SW4 set the charge circuit 21 to the second charge mode. In the second charge mode, the bus voltage VBUS is applied to the high electric potential power supply terminal 24a of the charger 24, and the voltage of the ground terminal GND2, or the ground voltage, is applied to the low electric potential power supply terminal 24b of the charger 24.

When receiving the determination signal D4, indicating that the USB port of the power supply device 10 connected to the electronic device 20 is set to the DCP, the charge control circuit 27 generates, for example, the H-level control signals SG2, SG3 (e.g., bus voltage VBUS level). The switch SW2 connects the common terminal c1 to the terminal b1 in response to the H-level control signal SG2. The switch SW3 connects the common terminal c2 to the terminal b2 in response to the H-level control signal SG3. Thus, the data terminals DP2, DM2 are short-circuited and coupled to the terminal b3 of the switch SW4. In this situation, when detecting that the voltage V1 is negative based on the detection signal D6, the charge control circuit 27 generates the H-level control signal SG4. The switch SW4 connects the common terminal c3 to the terminal b3 in response to the H-level control signal SG4. Thus, the short-circuited data terminals DP2, DM2 are coupled to the low electric potential power supply terminal 24b of the charger 24. These connections of the switches SW2, SW3, SW4 set the charge circuit 21 to the first charge mode. In the first charge mode, the bus voltage VBUS is applied to the high electric potential power supply terminal 24a of the charger 24, and the negative voltage VM is applied to the low electric potential power supply terminal 24b of the charger 24.

When detecting that the voltage V1 is not negative based on the detection signal D6, the charge control circuit 27 generates the L-level control signals SG2 to SG4. This sets the charge circuit 21 to the second charge mode.

As described above, the charger 24 is coupled to the power supply terminal Vbus2 and the output terminal of the mode setting circuit 25 (i.e., common terminal c3 of switch SW4). In the present example, the power supply terminal Vbus2 is coupled to the high electric potential power supply terminal 24a of the charger 24, and the bus voltage VBUS is supplied to the charger 24 from the power supply terminal Vbus2 and serves as a high electric potential power supply voltage. Additionally, the output terminal (common terminal c3) of the mode setting circuit 25 is coupled to the low electric potential power supply terminal 24b of the charger 24, and the voltage (negative voltage VM or ground voltage), which corresponds to the charge mode set by the mode setting circuit 25, is supplied to the charger 24 and serves as a low electric potential power supply voltage. The charger 24 charges the rechargeable battery 22 based on DC voltage having the electric potential difference between the high electric potential power supply terminal 24a and the low electric potential power supply terminal 24b.

In the first charge mode, the charger 24 charges the rechargeable battery 22 based on DC voltage having the electric potential difference between bus voltage VBUS applied to the high electric potential power supply terminal 24a and the negative voltage VM applied to the low electric potential power supply terminal 24b. That is, the charger 24 charges the rechargeable battery 22 with power received by the charge circuit 21 between the power supply terminal Vbus2 and the data terminals DP2, DM2.

In the second charge mode, the charger 24 charges the rechargeable battery 22 based on DC voltage having the electric potential difference between the bus voltage VBUS applied to the high electric potential power supply terminal 24a and the ground voltage applied to the low electric potential power supply terminal 24b. That is, the charger 24 charges the rechargeable battery 22 with power received by the charge circuit 21 between the power supply terminal Vbus2 and the ground terminal GND2. When the charging of the rechargeable battery 22 is completed, the charger 24 provides the charge completion signal D5 to the charge control circuit 27.

In the present embodiment, the current detection circuit 13 is one example of a first current detection circuit, the current detection circuit 14 is one example of a second current detection circuit, the control circuit 16 is one example of a switch control circuit, the power supply E1 is one example of a first power supply, and the power supply E2 is one example of a second power supply. The power supply terminal Vbus1 is one example of a first power supply terminal, the power supply terminal Vbus2 is one example of a second power supply terminal, the data terminal DP1 is one example of a first data terminal, the data terminal DM1 is one example of a second data terminal, the data terminal DP2 is one example of a third data terminal, the data terminal DM2 is one example of a fourth data terminal, the ground terminal GND1 is one example of a first ground terminal, and the ground terminal GND2 is one example of a second ground terminal. The switch SW1 is one example of a first switch, the switch SW2 is one example of a second switch, the switch SW3 is one example of a third switch, and the switch SW4 is one example of a fourth switch. The common terminal c1 is one example of a first common terminal, the common terminal c2 is one example of a second common terminal, the common terminal c3 is one example of a third common terminal, the terminal a1 is one example of a first terminal, the terminal b1 is one example of a second terminal, the terminal a2 is one example of a third terminal, the terminal b2 is one example of a fourth terminal, the terminal a3 is one example of a fifth terminal, and the terminal b3 is one example of a sixth terminal. The detection signal D1 is one example of a first detection signal, the detection signal D2 is one example of a second detection signal, the detection signal D6 is one example of a third detection signal, the control signal SG1 is one example of a first control signal, the control signal SG2 is one example of a second control signal, the control signal SG3 is one example of a third control signal, the control signal SG4 is one example of a fourth control signal, the current I1 is one example of a first current, and the current I2 is one example of a second current.

Figure 2:
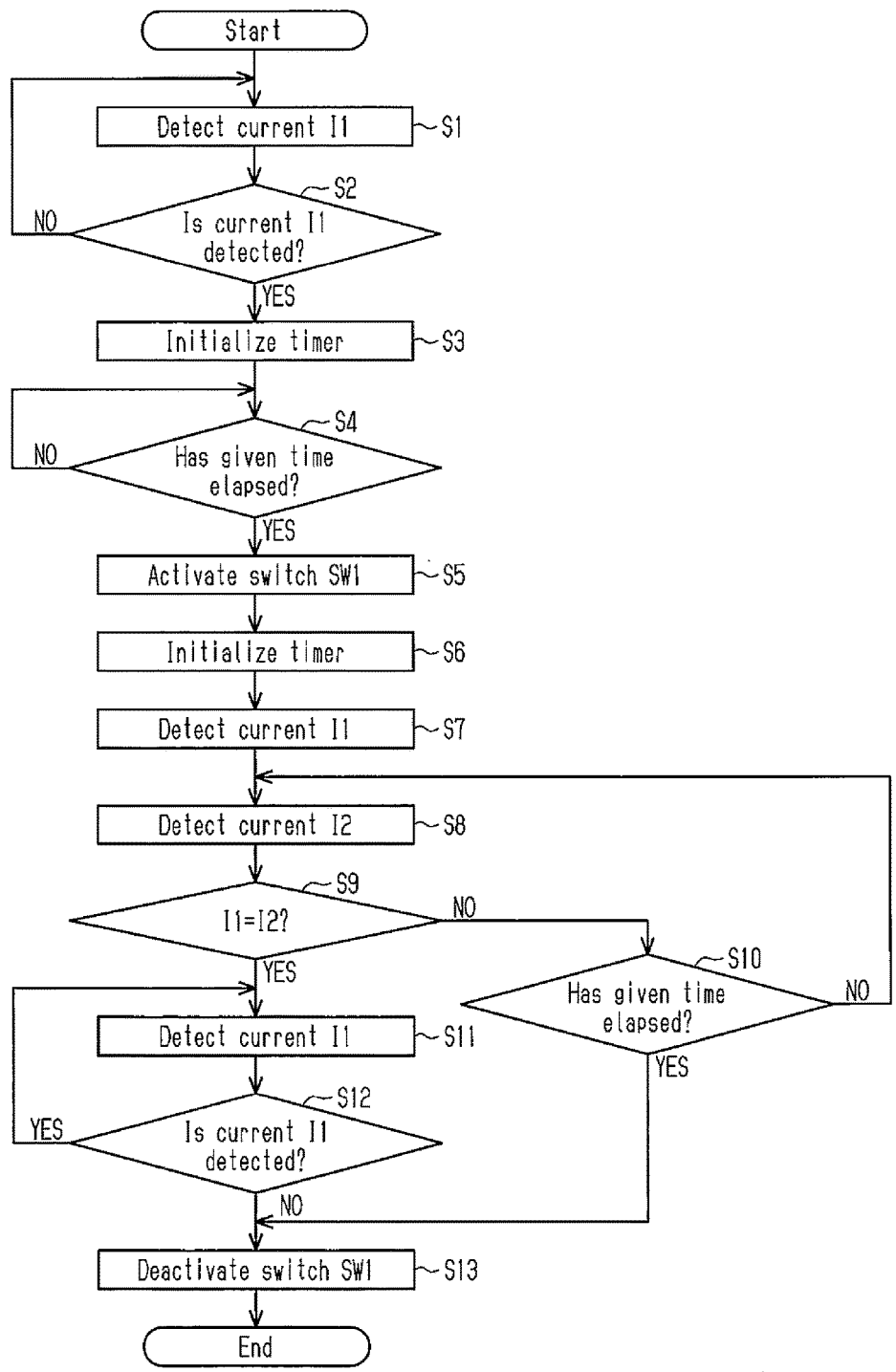
FIG. 2 is a schematic flowchart illustrating the operation of a power supply circuit in the charging system of FIG. 1.
Figure 3:
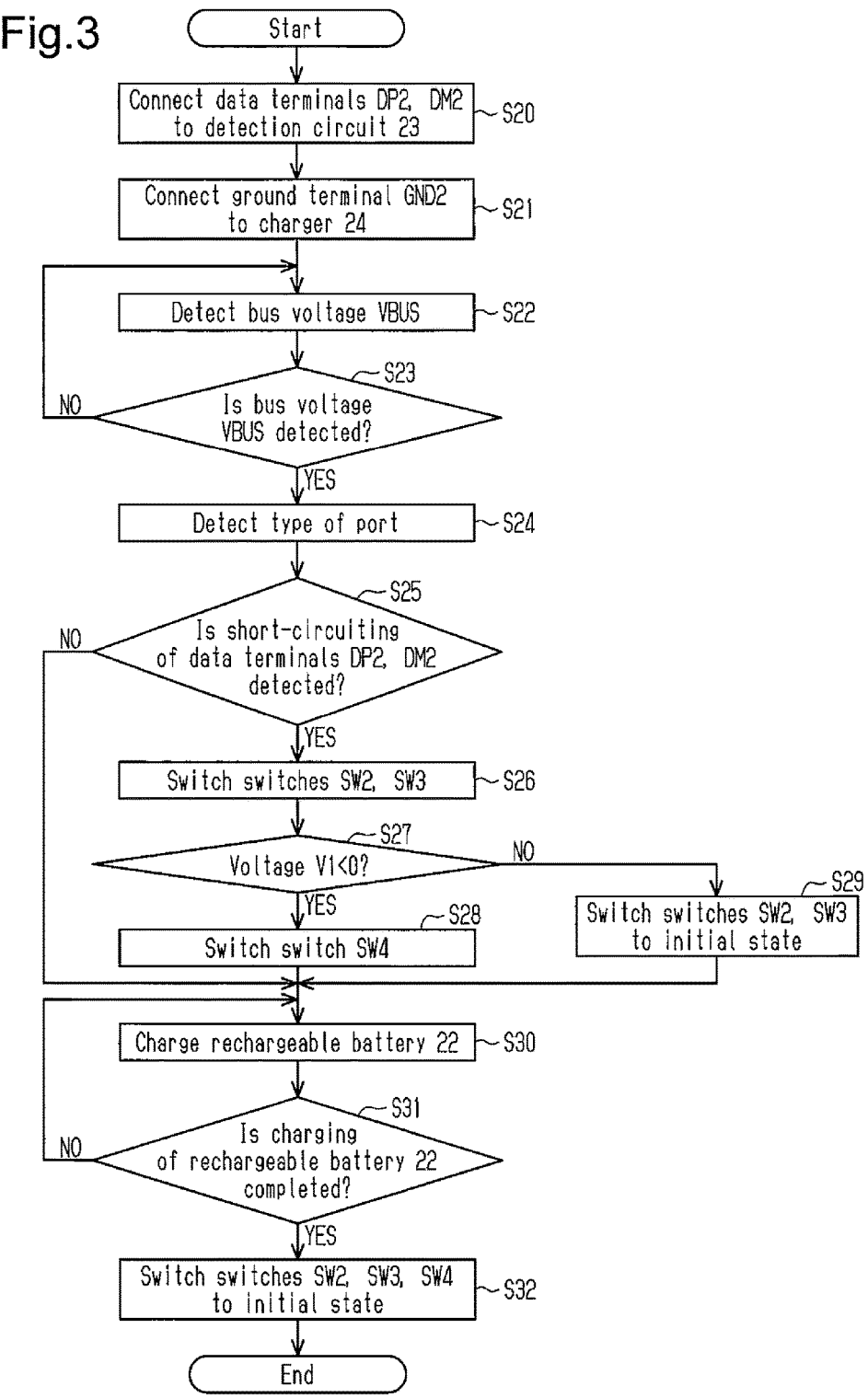
FIG. 3 is a schematic flowchart illustrating the operation of a charge circuit in the charging system of FIG. 1.

The operation of the charging system will now be described with reference to FIGS. 2 to 6. FIG. 2 is a flowchart illustrating the operation (method for supplying power) of the power supply circuit 11 (particularly, negative voltage control circuit 12). FIG. 3 is a flowchart illustrating the operation (charging method) of the charge circuit 21 (particularly, mode setting circuit 25).

In step S1 of FIG. 2 and steps S20, S21 of FIG. 3, the power supply device 10 is not connected to the electronic device 20. In this state, the current detection circuit 13 detects the current I1 between the power supply terminal Vbus1 and the ground terminal GND1 (step S1). The control circuit 16 determines whether or not the current I1 flows between the power supply terminal Vbus1 and the ground terminal GND1 based on the detection signal D1 from the current detection circuit 13 (step S2). That is, the control circuit 16 determines whether or not the current I1 is greater than 0 [A]. When the power supply device 10 is connected to the electronic device 20 by the cable 40, the current I1 flows between the power supply terminal Vbus1 and the ground terminal GND1. Thus, the control circuit 16 repeats steps S1, S2 until detecting that the current I1 is greater than 0 [A], that is, the power supply device 10 and the electronic device 20 are connected.

In the electronic device 20, the switches SW2 to SW4 are each set to an initial state until the electronic device 20 is connected to the power supply device 10 (steps S20, S21 of FIG. 3). In this state, the charge control circuit 27 generates the L-level control signals SG2, SG3. Thus, the switch SW2 connects the common terminal c1 to the terminal a1, and the switch SW3 connects the common terminal c2 to the terminal a2. This connects the data terminals DP2, DM2 to the detection circuit 23 (step S20). Additionally, the charge control circuit 27 generates the L-level control signal SG4. Thus, the switch SW4 connects the common terminal c3 to the terminal a3. This connects the ground terminal GND2 to the low electric potential power supply terminal 24b of the charger 24 (step S21).

The detection circuit 23 starts to detect the bus voltage VBUS supplied from the power supply terminal Vbus2 to the detection circuit 23 (step S22) and determines whether or not the bus voltage VBUS is detected (step S23). That is, the detection circuit 23 determines whether or not the bus voltage VBUS is greater than 0 [V]. When the electronic device 20 is connected to the power supply device 10 by the cable 40, the bus voltage VBUS is supplied from the power supply device 10 to the electronic device 20. Thus, the detection circuit 23 repeats steps S22, S23 until detecting that the bus voltage VBUS is greater than 0 [V], that is, the power supply device 10 and the electronic device 20 are connected.

In the power supply device 10, the control circuit 16 detects the current I1 based on the connection between the power supply device 10 and the electronic device 20 (YES in step S2 of FIG. 2). Thus, the process shifts to step S3. The control circuit 16 initializes the measurement time of the timer 15 and starts the timer operation (time measurement) performed by the timer 15 (step S3). The control circuit 16 determines whether or not a given time (e.g., one second) has elapsed from when the timer operation is started based on the termination signal D3 from the timer 15 (step S4). Step S4 is repeated until the given time elapses. The given time corresponds to, for example, a waiting time until the electronic device 20 accomplishes the detection of the USB port.

In the electronic device 20, the detection circuit 23 detects the bus voltage VBUS in accordance with the connection between the power supply device 10 and the electronic device 20 (YES in step S23 of FIG. 3). Thus, the process shifts to step S24. The detection circuit 23 detects the type of the USB port of the power supply device 10 connected to the electronic device 20 based on the electrical state of the data terminals DP2, DM2 (step S24). The port detection may be performed through a known process. For example, in the detection circuit 23, the signal line coupled to the data terminal DP2 is pulled up to the bus voltage VBUS level through a pull-up resistor, and the signal line coupled to the data terminal DM2 is pulled down to the ground voltage level through a pull-down resistor. Then, the detection circuit 23 detects the electric potential between the data terminals DP2, DM2 to detect the type of the USB port of the power supply device 10. For example, when the USB port of the power supply device 10 is the DCP, the short-circuiting of the data terminals DP1, DM1 via the short-circuit line L1 short-circuits the data terminals DP2, DM2. This sets the electric potential of the data terminal DP2 to the ground voltage level. Thus, when the electric potential of the data terminal DP2 is the ground voltage level, the detection circuit 23 determines that the USB port of the power supply device 10 is the DCP.

The charge control circuit 27 determines whether or not the short-circuiting of the data terminals DP2, DM2 is detected (step S25). That is, the charge control circuit 27 determines whether or not the determination signal D4, indicating that the USB port of the power supply device 10 is the DCP, is received. When the short-circuiting of the data terminals DP2, DM2 is detected (YES in step S25), the process shifts to step S26.

In step S26, the charge control circuit 27 generates the H-level control signals SG2, SG3. Thus, the switch SW2 connects the common terminal c1 to the terminal b1 in response to the H-level control signal SG2. In the same manner, the switch SW3 connects the common terminal c2 to the terminal b2 in response to the H-level control signal SG3. Consequently, the data terminals DP2, DM2 are short-circuited by the switches SW2, SW3 and the connection node CN. Further, the data terminals DP2, DM2 are coupled to the terminal b3 of the switch SW4.

In step S4 of FIG. 2, when the given time has elapsed (YES in step S4), the control circuit 16 generates the control signal SG1 that activates the switch SW1 (step S5). When the switch SW1 is activated, the negative voltage VM is applied to the short-circuited data terminals DP1, DM1. Further, the negative voltage VM is also applied to the data terminals DP2, DM2 of the electronic device 20. Step S5 may be performed in parallel to the switching of the switches SW2, SW3 (step S26) or after the switching of the switches SW2, SW3 is completed.

The control circuit 16 initializes the measurement time of the timer 15 and starts the time measurement performed by the timer 15 (step S6). In the electronic device 20, steps S27 to S29 are performed in parallel to step S6.

After switching the switches SW2, SW3 (step S26), the charge control circuit 27 waits for the time when the switch SW1 is certainly activated taking into consideration the given time measured in step S4 and then performs step S27. In step S27, the voltage detection circuit 26 detects the voltage V1 between the ground terminal GND2 and the data terminals DP2, DM2. Additionally, the charge control circuit 27 determines whether or not the voltage V1 is negative based on the detection signal D6 from the voltage detection circuit 26. Here, in the present example, the negative voltage VM is supplied to the data terminals DP2, DM2 from the power supply device 10. Thus, the voltage V1 is negative (YES in step S27). Therefore, in step S28, the charge control circuit 27 generates the H-level control signal SG4. Thus, the switch SW4 connects the common terminal c3 to the terminal b3. This connects the short-circuited data terminals DP2, DM2 to the low electric potential power supply terminal 24b of the charger 24 (i.e., the negative voltage VM of the charger 24 is supplied to the low electric potential power supply terminal 24b) and sets the charge circuit 21 to the first charge mode. This connection state between the power supply device 10 and the electronic device 20 will now be described with reference to FIG. 4.

Figure 4:
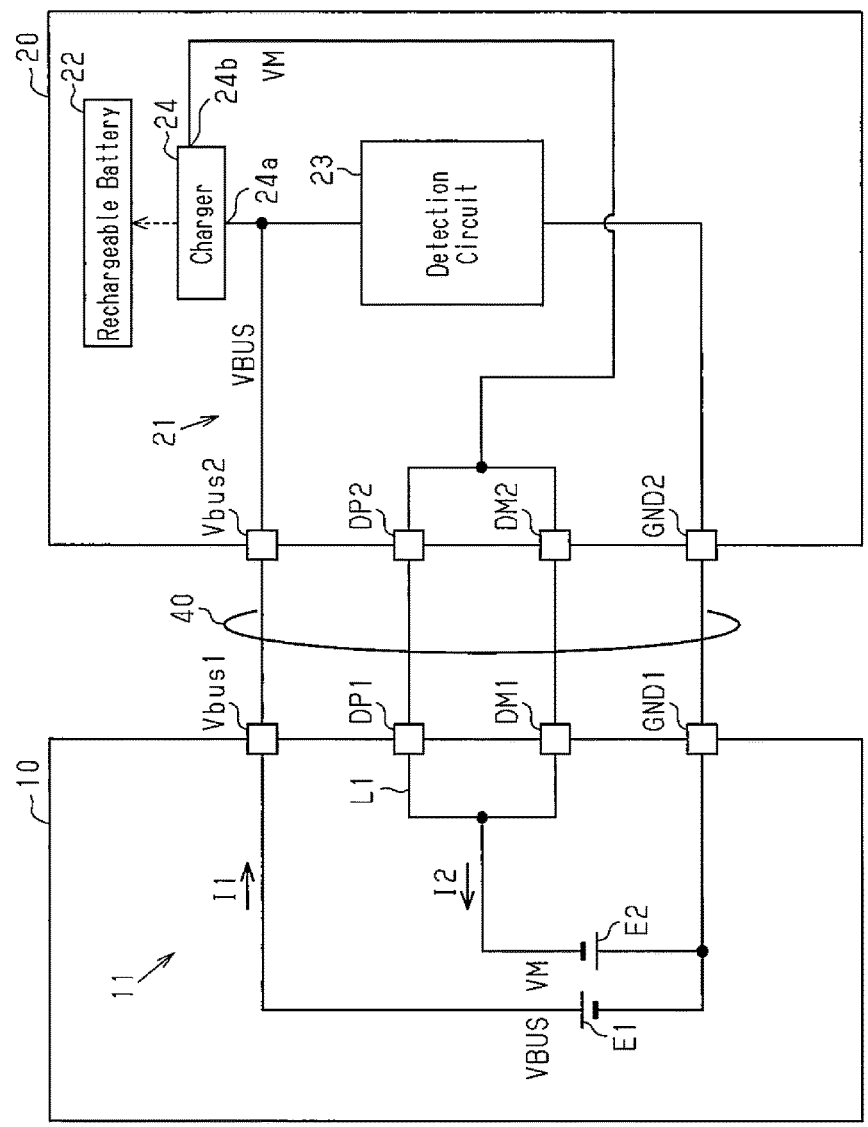
FIG. 4 is a block diagram illustrating a connection state of a power supply device and an electronic device in a first charge mode.

As illustrated in FIG. 4, the negative terminal of the power supply E2 is coupled to the low electric potential power supply terminal 24b of the charger 24 through the short-circuit line L1, the data terminals DP1, DM1, the signal lines of the cable 40, and the data terminals DP2, DM2. Also, the positive terminal of the power supply E2 is coupled to the negative terminal of the power supply E1. The positive terminal of the power supply E1 is coupled to the high electric potential power supply terminal 24a of the charger 24 through the power supply terminal Vbus1, the power supply line of the cable 40, and the power supply terminal Vbus2. Thus, the negative voltage VM is applied to the low electric potential power supply terminal 24b of the charger 24, and the bus voltage VBUS is applied to the high electric potential power supply terminal 24a of the charger 24. Therefore, in the electronic device 20, the charge circuit 21 receives power from the power supply device 10 between the power supply terminal Vbus2 and the data terminals DP2, DM2.

In other words, when detecting that the voltage V1 is negative (YES in step S27), the charge control circuit 27 determines that the connected power supply device 10 is capable of applying the negative voltage VM to the data terminals DP1, DM1, that is, the connected power supply device 10 includes the power supply E2. The charge control circuit 27 switches the switch SW4 so that power is received between the power supply terminal Vbus2 and the data terminals DP2, DM2.

In steps S26 to S28, which have been described, the process for switching a power reception terminal for receiving power from the power supply device 10 (i.e., process for switching the charge mode) is performed.

In the power supply device 10, step S6, which has been described, and subsequent steps S7 to S10 are performed in parallel to steps S27 and S28.

The current detection circuit 13 detects the current I1 flowing between the power supply terminal Vbus1 and the ground terminal GND1 (step S7). The current detection circuit 14 detects the current I2 flowing between the ground terminal GND1 and the data terminals DP1, DM1 (step S8). Then, the control circuit 16 determines whether or not the current value of the current I1 and the current value of the current I2 are equal based on the detection signal D1 from the current detection circuit 13 and the detection signal D2 from the current detection circuit 14 (step S9). At this time, for example, when the switching of the power reception terminal (particularly, switching of switch SW4) has not been completed, the current value of the current I1 and the current value of the current I2 are not equal (NO in step S9). In this case, the control circuit 16 determines whether or not the given time (e.g., one second) has elapsed from when the timer 15 starts the time measurement (step S10). That is, the control circuit 16 determines whether or not the termination signal D3 is received from the timer 15. When the given time has not yet elapsed (NO in step S10), steps S8, S9 are performed again.

In the present example, as illustrated in FIG. 4, a closed circuit is formed from the power supply E2 to the power supply E1 through the data terminals DP1, DM1, the signal lines of the cable 40, the data terminals DP2, DM2, the charger 24, the power supply terminal Vbus2, the power supply line of the cable 40, and the power supply terminal Vbus1. Thus, current flows between the power supply terminal Vbus1 and the data terminals DP1, DM1 within a fixed period from when the negative voltage VM is applied (step S5). Thus, the current value of the current I1 and the current value of the current I2 become equal. The given time of the timer 15 is set to be greater than the fixed time. Thus, when the closed circuit is formed, the current value of the current I1 and the current value of the current I2 become equal before the given time in the timer 15 elapses (YES in step S9). In this case, the control circuit 16 determines that the electronic device 20 connected to the power supply device 10 is an electronic device capable of receiving power between the power supply terminal Vbus2 and the data terminals DP2, DM2 (i.e., electronic device including the mode setting circuit 25). Then, the control circuit 16 terminates the detection of the current I2 performed by the current detection circuit 14. Further, the control circuit 16 continues to generate the control signal SG1 that activates the switch SW1 so that the switch SW1 continues to be activated.

Subsequently, in the power supply device 10, the current I1 is detected between the power supply terminal Vbus1 and the ground terminal GND1 (step S11). The control circuit 16 determines whether or not the current I1 flows between the power supply terminal Vbus1 and the ground terminal GND1 (step S12). At this time, when the current I1 is flowing, that is, the current value of the current I1 is greater than 0 [A] (YES in step S12), steps S11, S12 are performed again.

For example, when the electronic device 20 is disconnected or when the electronic device 20 stops receiving power, the current I1 does not flow. In this case, the current I1 is not detected (NO in step S12). Thus, the process shifts to step S13. In step S13, the control circuit 16 generates the control signal SG1 that deactivates the switch SW1. This stops the application of the negative voltage VM from the power supply E2 to the data terminals DP1, DM1.

In the electronic device 20, steps S30, S31 are performed in parallel to steps S11, S12. In the electronic device 20, after the switch SW4 is switched to connect the data terminals DP2, DM2 to the low electric potential power supply terminal 24b of the charger 24 (step S28), the charger 24 starts to charge the rechargeable battery 22 (step S30). In this case, as illustrated in FIG. 4, the charger 24 charges the rechargeable battery 22 with power received between the power supply terminal Vbus2 and the data terminals DP2, DM2. That is, the charger 24 charges the rechargeable battery 22 in the first charge mode. In the first charge mode, the negative voltage VM having an electric potential that is more negative than that of the ground terminal GND2 is applied to the data terminals DP2, DM2. Thus, the electric potential difference between the power supply terminal Vbus2 and the data terminals DP2, DM2 is greater than that between the power supply terminal Vbus2 and the ground terminal GND2. This increases power supplied to the charger 24 and charges the rechargeable battery 22 with the increased power. Thus, the charge time of the rechargeable battery 22 may be shortened.

For example, in the DCP, the upper limit of the current amount that can be supplied to the electronic device 20 is set to 1.5 [A], and the rated voltage of the bus voltage VBUS is set to 5 [V]. Thus, in the DCP, power that can be supplied to the electronic device 20 is specified to be 5 [V]×1.5 [A]=7.5 [W] at most. However, in the first charge mode, the charge circuit 21 receives power based on the electric potential difference between the bus voltage VBUS applied to the power supply terminal Vbus2 and the negative voltage VM applied to the data terminals DP2, DM2. Thus, when the negative voltage VM is set to −5 [V], the electric potential difference is 10 [V] between the bus voltage VBUS (power supply terminal Vbus2) and the negative voltage VM (data terminals DP2, DM2). Therefore, in the first charge mode, the power supply device 10 may supply power of 10 [V]×1.5 [A]=15 [W] according to the specification to the electronic device 20. Accordingly, the charger 24 may charge the rechargeable battery 22 with 15 W of power according to the specification. Thus, in the first charge mode, the rechargeable battery 22 may be charged with the power, which is increased due to the electric potential difference greater than the electric potential difference between the power supply terminal Vbus2 and the ground terminal GND2. This shortens the charge time of the rechargeable battery 22 compared to the second charge mode, in which power is received from the power supply device 10 between the power supply terminal Vbus2 and the ground terminal GND2.

The charge control circuit 27 determines whether or not the charging of the rechargeable battery 22 is completed (step S31). That is, the charge control circuit 27 determines whether or not the charge completion signal D5 is received from the charger 24. Here, steps S30, S31 are repeatedly performed until the charging of the rechargeable battery 22 is completed. When the charging of the rechargeable battery 22 is completed and the charge completion signal D5 is provided from the charger 24 to the charge control circuit 27 (YES in step S31), the charge control circuit 27 switches the switches SW2 to SW4 to the initial state (step S32). That is, the charge control circuit 27 generates the L-level control signals SG2 to SG4. Thus, the switch SW2 connects the common terminal c1 to the terminal a1, the switch SW2 connects the common terminal c2 to the terminal a2, and the switch SW4 connects the common terminal c3 to the terminal a3. This connects the ground terminal GND2 to the low electric potential power supply terminal 24b of the charger 24. Thus, the charge circuit 21 is shifted to the second charge mode, in which power is received between the power supply terminal Vbus2 and the ground terminal GND2.

Figure 5:
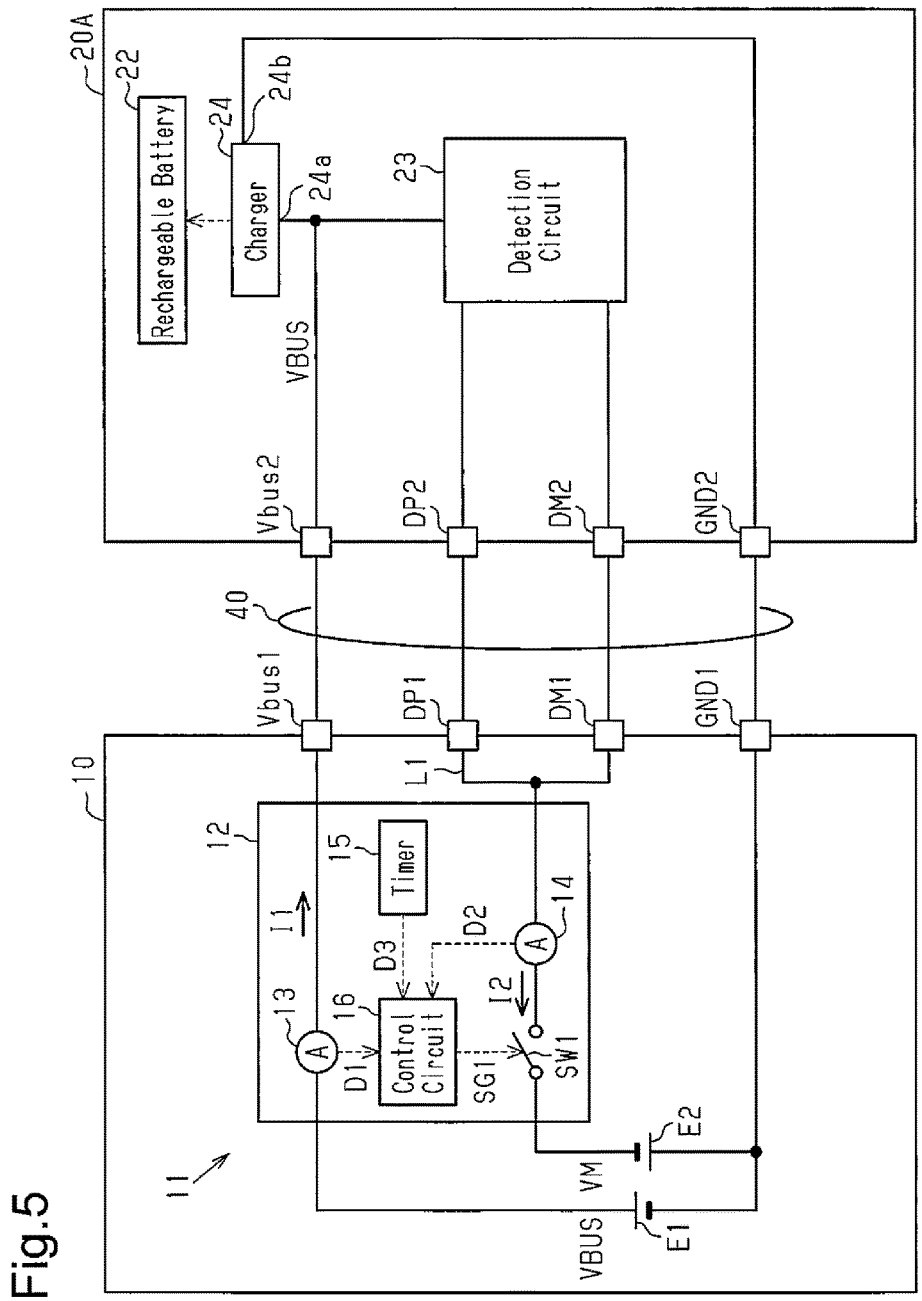
FIG. 5 is a block diagram illustrating a connection state of the power supply device of FIG. 1 and a conventional electronic device.

As illustrated in FIG. 5, the power supply device 10 may be connected to a conventional electronic device 20A, which does not include the mode setting circuit 25. In the electronic device 20A, the ground terminal GND2 is constantly coupled to the low electric potential power supply terminal 24b of the charger 24. Even in this case, in step S5 illustrated in FIG. 2, when the switch SW1 is activated, the negative voltage VM is applied to the data terminals DP2, DM2. However, the data terminals DP2, DM2 are coupled to, for example, a pull-up resistor or a pull-down resistor, and the electronic device 20A does not include the mode setting circuit 25. Thus, the data terminals DP2, DM2 are not coupled to the charger 24. Therefore, even when the given time elapses from when the timer 15 starts the operation in step S6, the current value of the current I1 and the current value of the current I2 do not become equal (NO in step S9 and YES in step S10). In this case, the control circuit 16 deactivates the switch SW1 (step S13).

In other words, when the current value of the current I1 and the current value of the current I2 do not become equal during a period from when the switch SW1 is activated until when the given time elapses, the control circuit 16 determines that the electronic device 20A, which does not include the mode setting circuit 25, is connected and deactivates the switch SW1. This stops the application of the negative voltage VM to the data terminals DP1, DM1. Therefore, when the electronic device 20A does not correspond to the first charge mode, in which power is received between the power supply terminal Vbus2 and the data terminals DP2, DM2, the application of the negative voltage VM may be promptly stopped. Further, when the conventional electronic device 20A is connected, power may be supplied between the power supply terminal Vbus2 and the ground terminal GND2 based on the bus voltage VBUS in the same manner as in the conventional art.

Figure 6:
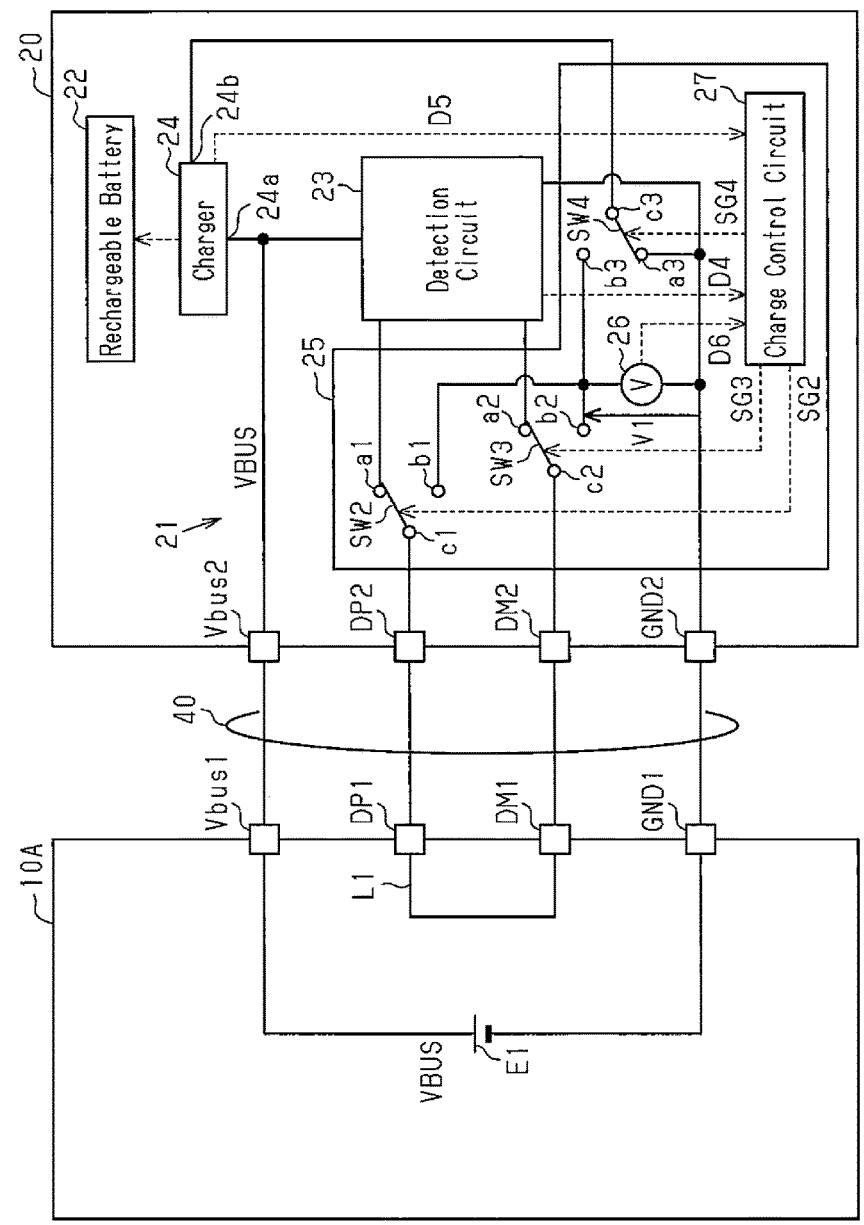
FIG. 6 is a block diagram illustrating a connection state of the electronic device of FIG. 1 and a conventional power supply device.

Further, as illustrated in FIG. 6, the electronic device 20 may be connected to a conventional power supply device 10A, which does not include the power supply E2 and the negative voltage control circuit 12 but includes the DCP. Even in this case, in step S26 illustrated in FIG. 3, when the switches SW2, SW3 are switched, the short-circuited data terminals DP2, DM2 are coupled to the terminal b3 of the switch SW4. However, in the power supply device 10, the data terminals DP1, DM1 are simply short-circuited by the short-circuit line L1. Thus, the voltage V1 between the short-circuited data terminals DP1, DM1 and the ground terminal GND2 does not become negative (NO in step S27). In this case, the charge control circuit 27 generates the L-level control signals SG2, SG3 to switch the switches SW2, SW3 to the initial state (step S29). This sets all of the switches SW2 to SW4 to the initial state. That is, the data terminals DP2, DM2 are coupled to the detection circuit 23, and the ground terminal GND2 is coupled to the low electric potential power supply terminal 24b of the charger 24.

In other words, when the voltage does not become negative between the short-circuited data terminals DP2, DM2 and the ground terminal GND2 after the short-circuiting of the data terminals DP2, DM2 is detected, the charge control circuit 27 determines that the conventional power supply device 10A, which does not correspond to the supply of the negative voltage VM from the data terminals DP1, DM1, is coupled and connects the ground terminal GND2 to the low electric potential power supply terminal 24b of the charger 24. This limits unstable circuit operations that would be caused by the low electric potential power supply terminal 24b of the charger 24 becoming an open end even when the conventional power supply device 10A is connected. Further, even when the conventional power supply device 10A is connected, the charge circuit 21 may receive power based on the bus voltage VBUS between the power supply terminal Vbus2 and the ground terminal GND2 and charge the rechargeable battery 22 with the received power.

When a power supply device including the SDP or CDP, which differs from the DCP, is connected, the short-circuiting of the data terminals DP2, DM2 is not detected (NO in step S25). Thus, the charging of the rechargeable battery 22 is started (step S30) without performing steps S26 to S29. That is, in this case, the charge control circuit 27 does not operate. Thus, while the switches SW2 to SW4 remain in the initial state, the charging of the rechargeable battery 22 starts in the second charge mode. Therefore, even when the power supply device including the SDP or CDP is connected, the charge circuit 21 may receive power based on the bus voltage VBUS between the power supply terminal Vbus2 and the ground terminal GND2 and charge the rechargeable battery 22 with the received power.

The present embodiment has the advantages described below.

(1) The power supply E2 (negative voltage control circuit 12) applies the negative voltage VM, which has a lower electric potential than the ground terminal GND1, to the data terminals DP1, DM1, which are short-circuited by the short-circuit line L1. Thus, the electric potential difference between the power supply terminal Vbus1 and the data terminals DP1, DM1 is increased from the electric potential difference between the power supply terminal Vbus1 and the ground terminal GND1. This increases power that may be supplied from the power supply device 10 to the electronic device 20. Consequently, the charging of the rechargeable battery 22 with the increased power shortens the charge time of the rechargeable battery 22.

(2) The charge time of the rechargeable battery 22 would be shortened, for example, by increasing the amount of current supplied from the power supply device 10 to the electronic device 20. However, this would need a dedicated charge cable, which does not conform to the USB battery charging standard.

In this regard, in the present embodiment, the power supplied to the electronic device 20 is increased by increasing the electric potential difference between the power supply terminal Vbus1 and the data terminals DP1, DM1 instead of increasing the current amount supplied from the power supply device 10 to the electronic device 20. Thus, the upper limit of the current amount supplied from the power supply device 10 to the electronic device 20 remains 1.5 [A], which is not changed from the specification of the DCP. Therefore, the USB port of the power supply device 10 and the power supply circuit 11 of the present embodiment comply with the USB battery charging standard. This allows a USB cable for the DCP to be used as the cable 40 between the power supply device 10 and the electronic device 20 without the need of a dedicated charge cable such as that described above.

(3) The negative voltage control circuit 12 applies the negative voltage VM to the data terminals DP1, DM1, which differ from the ground terminal GND1. Thus, the electric potential difference may be maintained, for example, at the rated voltage of 5 [V] between the power supply terminal Vbus1 and the ground terminal GND1.

(4) When the current I1 does not flow between the power supply terminal Vbus1 and the data terminals DP1, DM1 during a period from when the negative voltage VM is applied to the data terminals DP1, DM1 until when the given time elapses, the negative voltage control circuit 12 stops the application of the negative voltage VM. Thus, when the power supply device 10 is connected to the electronic device 20A, which does not correspond to the first charge mode for receiving power between the power supply terminal Vbus2 and the data terminals DP2, DM2, the application of the negative voltage VM may be promptly stopped. Thus, unnecessary application of the negative voltage to the data terminals DP1, DM1 and the data terminals DP2, DM2 is limited. This stabilizes the circuit operation in the electronic device 20A and reduces the unnecessary power consumption.

(5) When the power supply device 10 is connected to the conventional electronic device 20A, the power supply device 10 may supply power based on the bus voltage VBUS between the power supply terminal Vbus2 and the ground terminal GND2 of the electronic device 20A in the same manner as in the conventional art. Thus, even when the power supply device 10 is connected to the conventional electronic device 20A, the rechargeable battery 22 may be charged in the same manner as in the conventional art without interference.

(6) The mode setting circuit 25 is arranged to set the charge circuit 21 to the first charge mode or the second charge mode. In the first charge mode, the charge circuit 21 receives power between the power supply terminal Vbus2 and the data terminals DP2, DM2. In the second charge mode, the charge circuit 21 receives power between the power supply terminal Vbus2 and the ground terminal GND2. Thus, when connected to the power supply device 10 capable of applying the negative voltage VM to the data terminals DP1, DM1, the charge circuit 21 is set to the first charge mode to receive greater power than when set to the second charge mode. Consequently, the charging of the rechargeable battery 22 with the greater power shortens the charge time of the rechargeable battery 22.

(7) When detecting that the voltage V1 is not negative after detecting the short-circuiting of the data terminals DP2, DM2, the charge control circuit 27 connects the ground terminal GND2 to the low electric potential power supply terminal 24b of the charger 24. Thus, even when the electronic device 20 is connected to the power supply device 10A, which does not correspond to the supply of the negative voltage VM from the data terminals DP1, DM1, the low electric potential power supply terminal 24b of the charger 24 does not become an open end. This limits unstable operations of the charger 24.

(8) When the conventional power supply device 10A is connected to the electronic device 20, the electronic device 20 receives power based on the bus voltage VBUS between the power supply terminal Vbus2 and the ground terminal GND2 and charges the rechargeable battery 22 with the power. Thus, even when the conventional power supply device 10A is connected to the electronic device 20, the rechargeable battery 22 may be charged in the same manner as in the conventional art without interference.

It should be apparent to those skilled in the art that the foregoing embodiment may be embodied in many other specific forms without departing from the scope of this disclosure. Particularly, it should be understood that the foregoing embodiment may be embodied in the following forms.

In the power supply device 10 of the above embodiment, after the switch SW1 is activated, the control circuit 16 (negative voltage control circuit 12) determines whether or not the current I1 and the current I2 are equal to determine whether or not current flows between the power supply terminal Vbus1 and the data terminals DP1, DM1. However, the detection process is not particularly limited to that of the above embodiment as long as whether or not current flows between the power supply terminal Vbus1 and the data terminals DP1, DM1 is detected.

In the power supply device 10 of the above embodiment, the power supply circuit 11 may include a USB port having the power supply terminal Vbus1, the data terminals DP1, DM1, and the ground terminal GND1.

In the electronic device 20 of the above embodiment, the charge circuit 21 may include a USB port having the power supply terminal Vbus2, the data terminals DP2, DM2, and the ground terminal GND2.

When the power supply device 10 of the above embodiment is only connected to the electronic device 20 that corresponds to the first charge mode, the negative voltage control circuit 12 may be omitted from the power supply circuit 11. In this case, as illustrated in FIG. 4, in the power supply circuit 11, the negative terminal of the power supply E2 is directly coupled to the short-circuit line L1 (data terminals DP1, DM1).

In the above embodiment, the power supply device 10 and the electronic device 20 each comply with the USB battery charging standard. However, the configuration of the above embodiment may be applied to various kinds of power supply devices and electronic devices that do not comply with the USB battery charging standard. However, in such cases, the power supply device and the electronic device each need to include a power supply terminal and two data terminals. Further, the two data terminals need to be short-circuited in the power supply device.

All examples and conditional language recited herein are intended for pedagogical purposes to aid the reader in understanding the principles of this disclosure and the concepts contributed by the inventors to furthering the art, and are to be construed as being without limitation to such specifically recited examples and conditions, nor does the organization of such examples in the specification relate to an illustration of the superiority and inferiority of the disclosure. Although embodiments have been described in detail, it should be understood that various changes, substitutions, and alterations could be made hereto without departing from the spirit and scope of this disclosure.

The invention claimed is:

1. A power supply circuit comprising:
a first power supply adapted to be electrically coupled to a first power supply terminal and a first ground terminal, wherein the first power supply supplies the first power supply terminal with a DC voltage having a higher electric potential than the first ground terminal;

a short-circuit line adapted to short-circuit a first data terminal and a second data terminal; and
a second power supply including a positive terminal and a negative terminal, wherein the positive terminal is adapted to be electrically coupled to the first ground terminal and the negative terminal is adapted to be electrically coupled to the short-circuit line, and wherein the second power supply supplies the first data terminal and the second data terminal with a negative voltage having a lower electric potential than the first ground terminal.

2. The power supply circuit according to claim 1, further comprising
a negative voltage control circuit that includes:
a first switch electrically coupled between the second power supply and the short-circuit line; and
a switch control circuit that generates a first control signal to control activation and deactivation of the first switch,
wherein the switch control circuit generates the first control signal such that the first switch is activated when the switch control circuit detects connection of an electronic device to the power supply circuit and such that the first switch is deactivated when current does not flow between the first power supply terminal and the first and second data terminals during a period from when the first switch is activated until when a given time elapses.

3. The power supply circuit according to claim 2, wherein the negative voltage control circuit further includes:
a first current detection circuit that detects a first current flowing between the first power supply terminal and the first ground terminal and provides the switch control circuit with a first detection signal, which indicates a current value of the first current; and
a second current detection circuit that detects a second current flowing between the first ground terminal and the first and second data terminals and provides the switch control circuit with a second detection signal, which indicates a current value of the second current, and
the switch control circuit generates the first control signal such that the first switch is activated when the switch control circuit detects the first current and such that the first switch is deactivated when the first current and the second current do not become equal during the period from when the first switch is activated until when the given time elapses.

4. A charge circuit comprising:
a detection circuit adapted to be electrically coupled to a second power supply terminal, a third data terminal, a fourth data terminal, and a second ground terminal, wherein the detection circuit determines a type of a power supply device connected to the charge circuit, based on an electric state of the third data terminal and the fourth data terminal, and generates a determination signal;
a mode setting circuit that sets the charge circuit to one of a first charge mode and a second charge mode based on the determination signal such that the charge circuit receives power from the power supply device between the second power supply terminal and the third and fourth data terminals in the first charge mode and such that the charge circuit receives power from the power supply device between the second power supply terminal and the second ground terminal in the second charge mode; and
a charger that charges a rechargeable battery with the power received in one of the first charge mode and the second charge mode.

5. The charge circuit according to claim 4, wherein
the mode setting circuit sets the charge circuit to the first charge mode when detecting short-circuiting of the third data terminal and the fourth data terminal and determining that a voltage between the second ground terminal and the third and fourth data terminals is a negative voltage, and
the mode setting circuit sets the charge circuit to the second charge mode when detecting short-circuiting of the third data terminal and the fourth data terminal and determining that the voltage between the second ground terminal and the third and fourth data terminals is not a negative voltage.

6. The charge circuit according to claim 5, wherein the mode setting circuit includes:
a second switch including a first common terminal adapted to be electrically coupled to the third data terminal, a first terminal, coupled to the detection circuit, and a second terminal;
a third switch including a second common terminal adapted to be electrically coupled to the fourth data terminal, a third terminal coupled to the detection circuit, and a fourth terminal coupled to the second terminal;
a fourth switch including a fifth terminal adapted to be electrically coupled to the second ground terminal, a sixth terminal coupled to the second terminal and the fourth terminal, and a third common terminal coupled to a low electric potential power supply terminal of the charger;
a voltage detection circuit that detects a voltage between the second ground terminal and a connection node of the second terminal, the fourth terminal, and the sixth terminal and generates a third detection signal, which indicates a voltage value of a detected voltage; and
a charge control circuit that generates a second control signal, which controls switching of the second switch, a third control signal, which controls switching of the third switch, and a fourth control signal, which controls switching of the fourth switch, based on the determination signal and the third detection signal.

7. The charge circuit according to claim 6, wherein the charge control circuit generates the second control signal, the third control signal, and the fourth control signal such that:
before the charge circuit is connected to the power supply device, the first common terminal is coupled to the first terminal, the second common terminal is coupled to the third terminal, and the third common terminal is coupled to the fifth terminal;
when the charge control circuit detects short-circuiting of the third data terminal and the fourth data terminal based on the determination signal, the first common terminal is coupled to the second terminal and the second common terminal is coupled to the fourth terminal; and
when the charge control circuit determines based on the third detection signal that the voltage between the second ground terminal and the connection node is the negative voltage, the third common terminal is coupled to the sixth terminal.

8. A charging system comprising:
a power supply device, the power supply, device including a first power supply terminal, a first data terminal, a second data terminal, a first ground terminal, and a power supply circuit, wherein the power supply circuit includes:
- a first power supply electrically coupled to the first power supply terminal and the first ground terminal, wherein the first power supply supplies the first power supply terminal with a DC voltage having a higher electric potential than the first ground terminal;
- a short-circuit line that short-circuits the first data terminal and the second data terminal; and
- a second power supply electrically coupled to the first ground terminal and the short-circuit line, wherein the second power supply supplies the first data terminal and the second data terminal with a negative voltage having a lower electric potential than the first ground terminal; and
- an electronic device, the electronic device including a second power supply terminal electrically connectable to the first power supply terminal, a third data terminal electrically connectable to the first data terminal, a fourth data terminal electrically connectable to the second data terminal, a second ground terminal electrically connectable to the first ground terminal, and a charge circuit, wherein the charge circuit includes:
  - a detection circuit electrically coupled to the second power supply terminal, the third data terminal, the fourth data terminal, and the second ground terminal, wherein the detection circuit determines a type of a power supply device connected to the charge circuit, based on an electric state of the third data terminal and the fourth data terminal, and generates a determination signal;
  - a mode setting circuit that sets the charge circuit to one of a first charge mode and a second charge mode based on the determination signal such that the charge circuit receives power from the power supply device between the second power supply terminal and the third and fourth data terminals in the first charge mode and such that the charge circuit receives power from the power supply device between the second power supply terminal and the second ground terminal in the second charge mode; and
  - a charger that charges a rechargeable battery with the power received in one of the first charge mode and the second charge mode.

9. A method for supplying power from a power supply circuit, the method comprising:
  detecting connection of an electronic device to the power supply circuit, wherein the power supply circuit is electrically connected to the electronic device via a first power supply terminal, a first data terminal, a second data terminal, and a first ground terminal with the first data terminal being short-circuited to the second data terminal; after detecting connection of the electronic device, applying a negative voltage to the first data terminal and the second data terminal;
  detecting a first current flowing between the first power supply terminal and the first ground terminal;
  detecting a second current flowing between the first ground terminal and the first and second data terminals;
  determining whether or not the first current is equal to the second current;
  continuing application of the negative voltage when the first current and the second current become equal during a period from when the negative voltage is applied until when a given time elapses; and
  stopping application of the negative voltage when the first current and the second current do not become equal during the period.

10. A method for charging a rechargeable battery with a charge circuit, the method comprising:
  detecting connection of a power supply device to the charge circuit, wherein the charge circuit is electrically connected to the power supply device via a second power supply terminal, a third data terminal, a fourth data terminal, and a second ground terminal;
  after detecting connection of the power supply device, determining an electric state of the third data terminal and the fourth data terminal, wherein the determining includes detecting a short-circuit state of the third data terminal and the fourth data terminal;
  determining a type of the power supply device based on the electric state of the third data terminal and the fourth data terminal;
  when detecting the short-circuit state of the third data terminal and the fourth data terminal, determining whether or not a voltage between the second ground terminal and the third and fourth data terminals is a negative voltage;
  when the voltage between the second ground terminal and the third and fourth data terminals is the negative voltage, receiving first power from the power supply device between the second power supply terminal and the third and fourth data terminals, and charging the rechargeable battery with the received first power; and
  when the voltage between the second ground terminal and the third and fourth data terminals is not the negative voltage, receiving second power from the power supply device between the second power supply terminal and the second ground terminal, and charging the rechargeable battery with the received second power.

* * * * *